United States Patent
Pate

(10) Patent No.: US 9,824,595 B1
(45) Date of Patent: Nov. 21, 2017

(54) AIRCRAFT MONITORING AND ANALYSIS USING EDGE COMPUTING

(71) Applicant: Jeremiah T. Pate, Oro Valley, AZ (US)

(72) Inventor: Jeremiah T. Pate, Oro Valley, AZ (US)

( * ) Notice: Subject to any disclaimer, the term of this patent is extended or adjusted under 35 U.S.C. 154(b) by 0 days.

(21) Appl. No.: 15/352,362

(22) Filed: Nov. 15, 2016

(51) Int. Cl.
G08G 5/00 (2006.01)
H04L 29/08 (2006.01)
G06F 17/30 (2006.01)
B64D 45/00 (2006.01)
G07C 5/08 (2006.01)
H04W 84/06 (2009.01)

(52) U.S. Cl.
CPC .......... *G08G 5/0056* (2013.01); *B64D 45/00* (2013.01); *G06F 17/3053* (2013.01); *G07C 5/0808* (2013.01); *G07C 5/0841* (2013.01); *G08G 5/0021* (2013.01); *H04L 67/12* (2013.01); *B64D 2045/0065* (2013.01); *H04W 84/06* (2013.01)

(58) Field of Classification Search
CPC .... G08G 5/0056; G08G 5/0021; B64D 45/00; B64D 2045/0065; G06F 17/3053; H04L 67/12; H04W 84/06; G07C 5/0808; G07C 5/0841
See application file for complete search history.

(56) References Cited

U.S. PATENT DOCUMENTS 9,540,117 B2 * 1/2017 Mumaw ............. G05B 23/0251
9,607,445 B2 * 3/2017 Jensen ................. G07C 5/0808
9,663,242 B2 * 5/2017 Fournier ................ G01C 23/00
2015/0097706 A1 * 4/2015 Perger ..................... G01C 23/00 340/977
2016/0196696 A1 * 7/2016 Pereira ................... G07C 5/008 701/31.4
2016/0292932 A1 * 10/2016 Gremmert ............. G07C 5/008
2017/0144773 A1 * 5/2017 Raman .................. B64D 45/00

OTHER PUBLICATIONS

D'Ausilio, A., "Arduino: A low-cost multipurpose lab equipment," Behavior Research Methods, Oct. 2012 (10 pgs).
Gaura et al., "Edge mining the internet of things," IEEE Sensors, vol. 13 (10): 3816-3825 (10 pgs).

(Continued)

*Primary Examiner* — Mohamed Barakat
(74) *Attorney, Agent, or Firm* — Hayes Soloway P.C.

(57) ABSTRACT

A multi-layered edge computing method for aircraft monitoring and analysis includes providing an aircraft having a plurality of sensors connected to a flight data acquisition unit (FDAU), and providing a processing device having a processor, a non-transitory computer-readable memory, and a transmitter, wherein the processing device is in communication with the FDAU, wherein sensor data stored within the FDAU is communicated to the processing device, wherein, during flight of the aircraft, the processor analyzes the sensor data from the FDAU to detect an occurrence of at least one emergency event. The processing device ranks the at least one emergency event for transmission priority according to sensor type and severity and provides a signal transmitted to a flight control authority upon ranking of the at least one emergency event, wherein the signal has an alert sequence according to the ranking.

20 Claims, 6 Drawing Sheets

(56) References Cited

OTHER PUBLICATIONS

Rantanen et al., "Derivation of Pilot Performance Measures from Flight Data Recorder Information," Proceedings of the 11$^{th}$ International Symposium on Aviation Psychology, Mar. 5-8, 2001, Columbus, OH: The Ohio State University (6 pgs).
Suresh et al., "Neural networks based identification of helicopter dynamics using flight data," Proceedings of the 9$^{th}$ International Conference on Neural Information Processing (ICONIP'02), vol. 1 Dec. 2002 (6 pgs).
Thiprungsri, S., "Cluster Analysis for Anomaly Detection," Rutgers Business School, Jul. 31, 2010 (16 pgs).

* cited by examiner

AIRCRAFT MONITORING AND ANALYSIS USING EDGE COMPUTING

FIELD OF THE DISCLOSURE

The present disclosure is generally related to aircraft monitoring and more particularly is related to methods for analyzing aircraft sensor data and alerting flight control authorities.

BACKGROUND OF THE DISCLOSURE

Aviation is one of the most used forms of transportation in the world. On average, there are around 100,000 daily flights originating from approximately 9,000 airports. While air travel is considered to be among the safest forms of travel, there is some risk that a plane may crash. Furthermore, since 1948, eighty-eight commercial airplanes have disappeared during flights, never to be recovered.

Traditional aviation safety involves aircraft monitoring, wherein flight data from instruments is continuously collected and stored. The flight data recorder (FDR), otherwise known as the black box, is one of the most important technologies for aviation safety. A flight data acquisition unit (FDAU)—installed in most modern aircraft—receives various discrete, analog, and digital parameters from several sensors and avionics systems. The data collected by the FDAU are then recorded on the FDR, which is housed in the black box. In the event of an accident, investigators can analyze the data on the black box, which is designed to survive accidents, in order to determine the causes of the accident.

In addition, aircraft use communication protocols which continuously transmit flight data to ground centers for real-time analysis and monitoring. Modern aircraft use Automatic Dependent Surveillance Broadcast (ADS-B), which broadcasts information about an aircraft's location, airspeed, and other data to air traffic control displays. Pilots can also receive weather and traffic position information delivered directly to the cockpit through the ADS-B system. However, these safety mechanisms, while extremely useful, are still severely lacking in three ways.

First, data transmission is prohibitively expensive. Transmission must be performed via satellite network, which has limited bandwidth and throughput. Additionally, it is estimated that it would cost billions of dollars to implement continuous flight data streaming across the airline industry, as data transmitters alone can cost up to $100,000 each. Second, data transmission systems are vulnerable to attack. Hackers can already track airplanes with sufficient precision using less than $1,000 worth of equipment. A two-way communication interface such as ADS-B is vulnerable to security breaches from bad actors. The airline industry is concerned about any transmission system that increases the possibility of proprietary and technical information being leaked. Furthermore, pilots are concerned that every instance of a flight will be reviewed with unjustified scrutiny. Third, FDRs record such large amounts of data that they require complex automated analysis and data mining techniques to extract useful information. This imposes significant overhead costs on processing power, especially where low latency is a concern.

Thus, a heretofore unaddressed need exists in the industry to address the aforementioned deficiencies and inadequacies.

SUMMARY OF THE DISCLOSURE

Embodiments of the present disclosure provide a method for monitoring aircraft performance during flight. In this regard, one embodiment of this method, among others, can be broadly summarized by the following steps: providing an aircraft having a plurality of sensors connected to a flight data acquisition unit (FDAU); providing a processing device having a processor, a non-transitory computer-readable memory, and a transmitter, wherein the processing device is in communication with the FDAU, wherein sensor data stored within the FDAU is communicated to the processing device, wherein, during flight of the aircraft, the processor analyzes the sensor data from the FDAU to detect an occurrence of at least one emergency event; ranking the sensor data for transmission priority according to the following steps: assigning to the sensor data a first coefficient according to sensor data type, assigning to the sensor data a second coefficient according to the severity of the at least one emergency event, multiplying said first and second coefficients to determine an urgency number of the sensor data, and ordering the sensor data from highest to lowest urgency numbers; and providing a signal transmitted to a flight control authority upon ranking of the sensor data, wherein the signal has an alert sequence according to the ranking.

The present disclosure can also be viewed as providing a system for monitoring aircraft performance during flight. Briefly described, in architecture, one embodiment of the system, among others, can be implemented as follows. An aircraft having a plurality of sensors is connected to an FDAU and a processing device having a processor, a non-transitory computer-readable memory, and a transmitter. The processing device is in communication with the FDAU, and sensor data stored within the FDAU is communicated to the processing device. During flight of the aircraft, the processor analyzes the sensor data from the FDAU to detect an occurrence of at least one emergency event. The processing device provides a ranking of the sensor data for transmission priority according to the following steps: assigning to the sensor data a first coefficient according to sensor data type; assigning to the sensor data a second coefficient according to the severity of the at least one emergency event; multiplying said first and second coefficients to determine an urgency number of the sensor data; and ordering the sensor data from highest to lowest urgency numbers. The transmitter transmits a signal to a flight control authority upon ranking of the sensor data, the signal having an alert sequence according to the ranking.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure provides a system and method for monitoring aircraft using edge computing, which reduces the amount of transmitted data. This in turn reduces the latency and energy overheads that arise from data transmission. Beyond this, edge computing provides improved cost, security, and privacy to the system.

Edge computing is a methodology that pushes the computing functions of data systems away from centralized nodes and toward the source of the data. In aircraft monitoring, this is embodied by a processing device connected to the FDAU on an aircraft. The FDAU receives data from several sensors on the aircraft, which it stores in an FDR. At the same time, the processing device analyzes all of the incoming data according to a parametric bracket analysis. If data points fall outside of a bracket, the processing device registers this as an emergency event. When multiple emergency events are registered, the sensor data is ranked for transmission priority according to the urgency of the emergency event. All sensor data relevant to emergency events is ordered by urgency and transmitted to appropriate flight control authorities for reporting and further analysis. Additionally, the processing device can perform a heuristic analysis of the data against a database of potential responses to facilitate faster responses. All of this is accomplished without the need to continuously stream data to a central hub for analysis.

Figure 1:
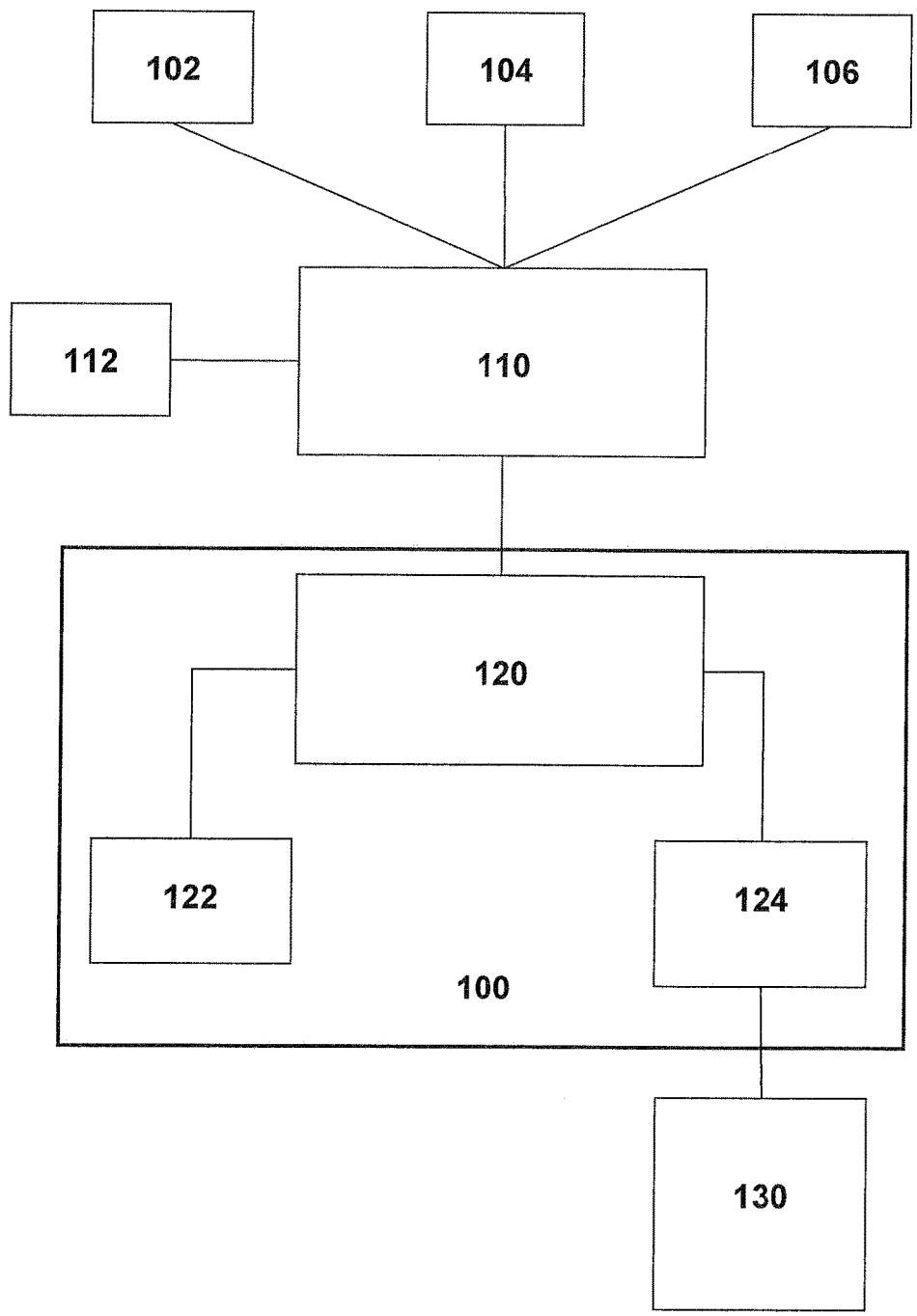
FIG. 1 is a block diagram of the components of the invention within the aircraft.

FIG. 1 is a block diagram showing the components of the invention inside the aircraft. The aircraft (not shown) has a plurality of sensors 102, 104, 106 connected to an FDAU 110. The sensors may be any sensors commonly found in aircraft, such as altitude sensors, GPS sensors, barometric pressure sensors, temperature sensors, accelerometers, and the like. The sensors are electrically connected to the FDAU 110, which feeds all of the sensor data into an FDR 112. The FDR 112 provides robust storage for all of the sensor data which can be reviewed after an accident or other emergency event on the aircraft. The FDAU 110 is also in communication with a processing device 100 through one of the many ports in the FDAU 110. The processing device 100 has a processor 120, a non-transitory computer-readable memory 122, and a transmitter 124. The processor 120 is electrically connected to the non-transitory computer-readable memory 122, which may hereinafter be referred to as "memory". Preferably, the memory is non-volatile and radiation hardened, such as Everspin® memory. When the processor 120 receives data from the FDAU 110, the processor 120 stores the data in the memory 122. During a flight of the aircraft, the processor 120 analyzes the sensor data from the FDAU 110 to detect an occurrence of at least one emergency event. The analysis is discussed in greater detail in FIG. 2A. If the processor 120 detects at least one emergency event, it creates an alert sequence regarding the emergency event. Frequently, multiple emergency events are detected. The processor 120 ranks the events for broadcast priority and creates an alert sequence according to this ranking. The ranking analysis is discussed in greater detail in FIG. 2B. A signal containing the alert sequence is transmitted by the transmitter 124 within the processing device 100. Generally, the signal may be transmitted by a satellite network 130, such as an Iridium® network. The signal may be transmitted to flight control authorities monitoring the aircraft from the ground.

Figure 2A:
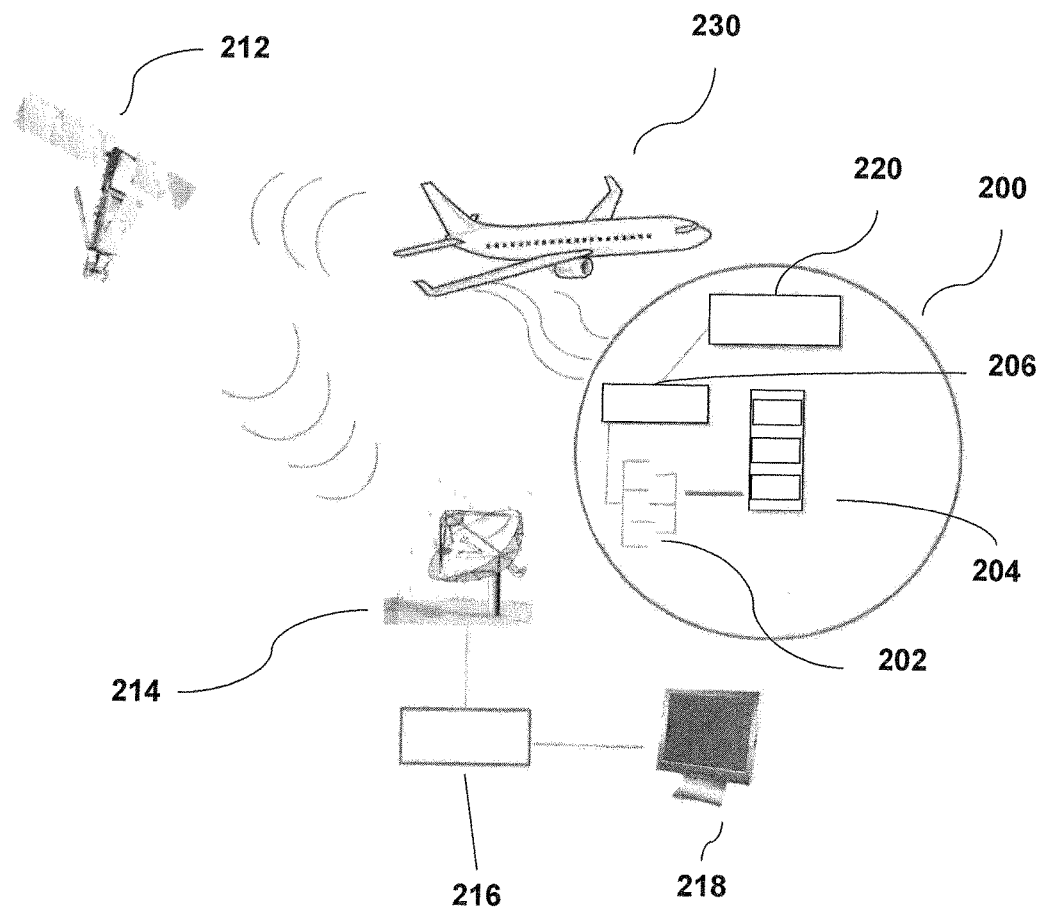
FIG. 2A is an illustration of the invention in operation during a flight.

FIG. 2A is an illustration of the system for monitoring aircraft safety in operation. The system operates while the aircraft 230 is in flight. Data from the aircraft sensors shown in FIG. 1 is fed to the FDAU (not shown) and then into the processing device 200 for analysis. The data is first processed using a parametric bracket analysis system 202. The parametric bracket analysis system 202 is software that continuously analyzes whether any of the data parameters fall outside of pre-determined ranges, or brackets. For example the load factor, or g-factor, is the ratio of an aircraft's lift to its weight. The load factor of the average passenger aircraft should typically not exceed 2 gs. The parametric bracket analysis system 202 receives data from the FDAU, analyzes the data relevant to lift and weight, and detects if the airframe has exceeded the typical load factor. Federal law mandates that turbine-powered airplanes record up to 91 types of sensor data. Any type or combination of types of data may be analyzed by the parametric bracket analysis system 202.

The processing device 200 classifies any outlying parameters as emergency events. In a preferred embodiment, emergency events may be further classified according to severity. For example, the processing device 200 may designate a "caution" classification when data exceeds a bracket range by a small amount, but a "danger" classification when data exceeds a bracket range by a great amount.

After detecting emergency events, a software ranking system 204 ranks the data for transmission priority. Ranking is based on pre-determined metrics relative to potential aircraft emergencies, such as severity and immediacy of an emergency event. For example, data relative to an extreme drop in altitude may be ranked as a higher priority than data relative to a less extreme drop in altitude due to the severity of the drop in altitude. Additionally, data relative to extreme load factor may be ranked as a higher priority than data relative to malfunctioning landing gear due to the immediacy of the load factor event. The ranking system 204 may also rank the data in order of priority and the response latency requirements for detected emergency events. The ranking system 204 is discussed in greater detail in FIG. 3B.

Once a ranking has been created, the processing device 200 generates an alert sequence 206. The alert sequence 206 is a data stream containing the entire sensor data history relevant to each emergency event. The alert sequence 206 is ordered according to the ranking created by the ranking system 204, meaning that higher priority emergency events are listed first.

Next, the processing device 200 transmits a signal containing the alert sequence 206 to flight control authorities 218. Generally, the signal is transmitted over satellite network 212 to a ground receiver 214, which may connect to the internet at a node 216. Flight control authorities 218 can receive the signal through the internet and prepare emergency services as needed. In one embodiment, data contained within the alert sequence 206 may be compressed before transmission and decompressed upon receipt by flight control authorities 218.

In an additional embodiment, the processing device 200 may also have a heuristic system 220 for responding to the emergency events. The heuristic system is discussed in more detail in FIG. 2B.

As a security feature, the alert sequence 206 can only be generated from within the aircraft 230. System data is stored directly on-board within the memory. The processing device only transmits data when parametric analysis indicates that aspects of the aircraft 230 are impacted or mechanically impaired. Furthermore, the alert sequence can only be triggered by an error within the airframe; thus, the unit acts as a one-way node with no external radio communication inputs.

Figure 2B:
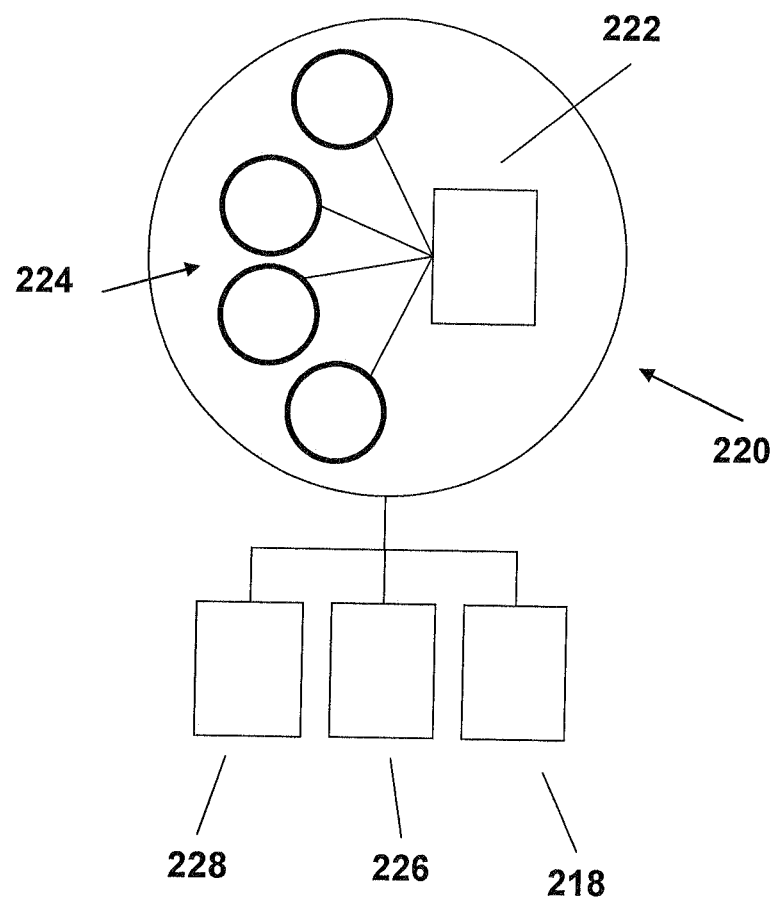
FIG. 2B is a block diagram of the heuristic system of the invention.

FIG. 2B shows a block diagram of the heuristic system 220. The processing device has an electronic database 222 of responses to emergency events 224. The database 222 may be stored within the memory of the processing device. In some embodiments, the database 222 may be stored separately from the memory. After the ranking system has generated a ranking, the alert signal is analyzed in software by a heuristic system 220. The heuristic system 220 is programmed with algorithms of potential responses to known emergencies, in order to enable real-time decisions and actions for mitigating the effects of the emergencies. The heuristic system 220 performs heuristic analysis of all of the potential responses to emergency events 224 to determine the best solutions to the ensuing emergencies. The heuristic system 220 selects a response from the database 222 and transmits the response in a second signal. The signal may be directed to an on-board aircraft control system 228, to the pilot 226, or to flight control authorities 218, since some of the solutions may be performed by the aircraft's on-board control system 228, while others may require the pilot's intervention.

In another embodiment, the heuristic system 220 may be located on the ground with flight control authorities 218. After the signal is received at the node shown in FIG. 2A, it is directed to a database 222 on the ground, rather than in the memory of the processing device. The heuristic system 220 operates the same as the embodiment located in the processing device 200. Once a response 222 has been selected, it is transmitted via the satellite network to the aircraft and to the on-board control system 228, pilot 226, or flight control authorities 218.

Figure 3A:
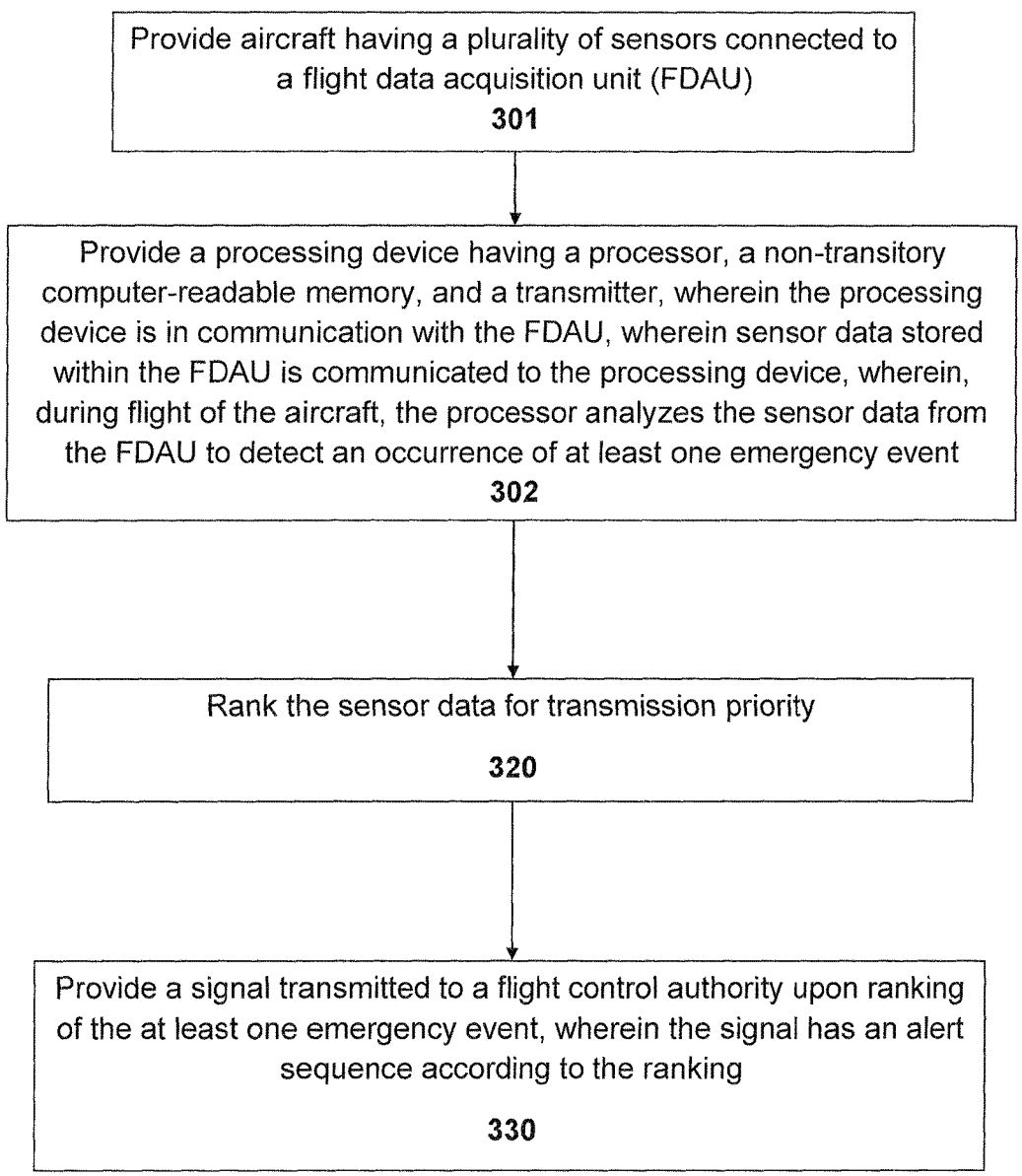
FIG. 3A is a flow chart of a method for monitoring aircraft safety according to the present invention.

FIG. 3A shows a method for monitoring aircraft safety according to the present invention. In step 301, an aircraft is provided having a plurality of sensors connected to an FDAU. In step 302, a processing device is provided having a processor, a non-transitory computer-readable memory, and a transmitter, wherein the processing device is in communication with the FDAU, wherein sensor data stored within the FDAU is communicated to the processing device, and wherein, during flight of the aircraft, the processor analyzes the sensor data from the FDAU to detect an occurrence of at least one emergency event. In step 320, the sensor data is ranked for transmission priority according to the ranking system described in FIG. 3B. Finally, in step 330, a signal is provided that is transmitted to a flight control authority upon ranking of the at least one emergency event, wherein the signal has an alert sequence according to the ranking in step 320.

Figure 3B:
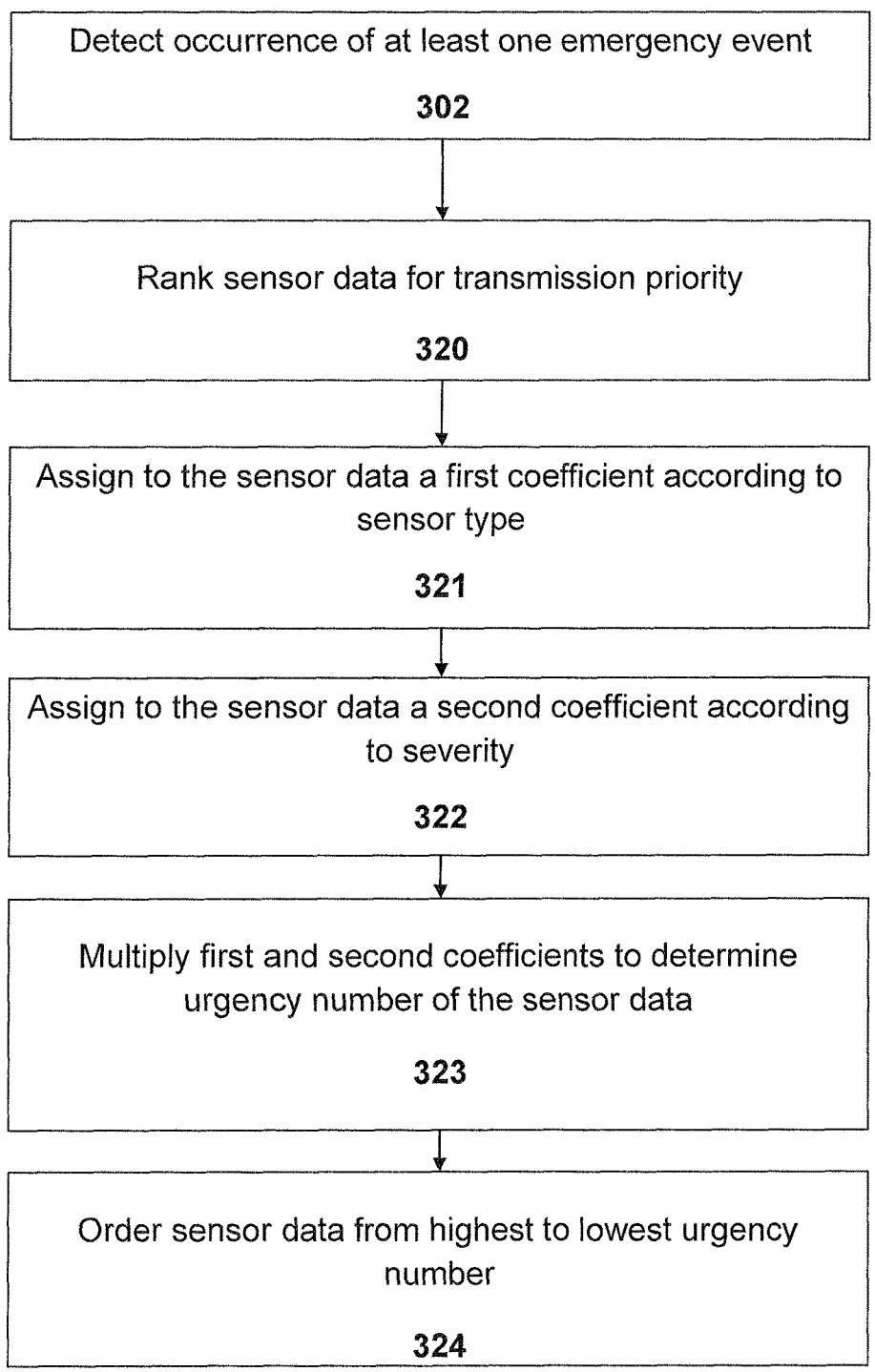
FIG. 3B is a flow chart showing the software ranking system employed by the processing device.

FIG. 3B is a flowchart showing the software ranking system employed by the processing device. When the parametric bracket analysis system detects the occurrence of an emergency event in step 302, it relays all of the data from the relevant sensor to the ranking system. When multiple emergency events are detected, data from multiple sensors is relayed to the ranking system. In step 320, the ranking system determines which sensor data should be transmitted first, second, third, and so on as part of the alert sequence. In step 321, the ranking system assigns to the sensor data a first coefficient according to the sensor type. The ranking system may do this by first sorting sensor data by sensor type. For example, sensors that indicate malfunctioning mechanical equipment, such as wing flaps, landing gear, turbine engines, or steering, may be sorted into one class. Sensors that indicate dangerous environmental conditions, such as extreme temperature, altitude change, or obstacles may be sorted into another class. Sensors that indicate travel and orientation, such as pitch, tilt, airspeed, or load factor, may be sorted into another class. In one embodiment, each class may be further sorted into subclasses. For example, the class containing mechanical equipment data may be further sorted into turbine, landing gear, and control subclasses. Each class or subclass may be assigned a first coefficient.

In step 322, the ranking system assigns to the sensor data a second coefficient according to severity. This may be accomplished by ranking the sensor data in each class according to how severely the sensor data falls outside the brackets of the parametric bracket analysis system. For example, sensor data indicating a slight loss of altitude may be ranked below data indicating a large loss of altitude. In one example, a second coefficient indicating higher priority may be given to sensor data that is at least 5% higher than the high bracket. Similarly, a second coefficient indicating higher priority may be given to sensor data that is at most 5% lower than the low bracket. Once the data in each class is ranked, the data is assigned a second coefficient.

In step 323, the first and second coefficients are multiplied to determine the urgency number of each set of sensor data. The urgency number is the product of the first and second coefficients, and it scores how urgently a set of sensor data should be transmitted to flight control authorities. In one embodiment, other coefficients may be considered in determining the urgency number. For example, relationships between emergency events in different sensor types may indicate that an emergency event is more urgent. For instance, if high temperatures are detected in portions of the aircraft near the fuel line, this may indicate a very urgent fire, and a third coefficient may be assigned to account for this. The third coefficient may be multiplied with the first and second coefficients to determine the urgency number of the emergency event.

In step 324, the sensor data are ordered by urgency number. Data sets with the highest urgency numbers are ordered to be first in the alert sequence, while data sets with lower urgency numbers follow according to numerical value. All data from the sensors is transmitted in the alert sequence to flight control authorities in the final step of FIG. 3A.

By way of example, the table below shows the software ranking system working in conjunction with the parametric bracket analysis system for a Boeing 777. As sensor data is received from various sensors on the aircraft, the parametric bracket analysis system compares the data against predetermined low bound, average, and high bound values. Once it is determined that sensor data is either within the bounds or outside the bounds, the software ranking system begins processing the data. All sensor data is given a first coefficient according to class and a second coefficient according to the severity of the sensor value. These first and second coefficients are multiplied to create an urgency number, and then each of the data sets is ranked according to the value of that number. The rank is used to organize the sensor data for transmission, then a signal is broadcast from the aircraft to appropriate flight control authorities. In this example, data from 5 sensors are compared against the expected values stored in the memory of the processing device. Data from the pitch and rate of climb sensors lie outside of the parametric bounds, indicating that the aircraft is climbing too quickly. The first 4 sensors, which are airframe sensors, are assigned the highest priority class coefficient, while the last sensor is assigned a lower priority class coefficient. The pitch and rate of climb sensors are then assigned high priority severity coefficients. The roll, altitude, and cabin pressure sensors are assigned lower priority severity coefficients, as that data is within acceptable ranges. The class and severity coefficients are multiplied, and the resulting values are ranked in a final order. The rate of climb sensor data will be transmitted first, followed by the pitch sensor data, the roll data, the altitude data, and the cabin pressure data, respectively.

TABLE 1

Example Parameters for Boeing 777

| Sensor | Sensor Value | Low Bound | Average | High Bound | In Bounds? | Pre-Rank Class | Severity | Transmit Rank |
|---|---|---|---|---|---|---|---|---|
| Pitch | 65° | −50° | 0° | 50° | No | 1 | 2 | 2 |
| Roll | 15° | −270° | 0° | 270° | Yes | 1 | 3 | 3 |
| Rate of Climb | 3,800 ft/min | −3,500 ft/min | 300 ft/min | 3,500 ft/min | No | 1 | 1 | 1 |
| Altitude | 39,000 ft | 3,000 ft | 35,000 ft | 43,100 ft | Yes | 1 | 4 | 4 |
| Cabin Pressure | 6,500 ft | n/a | eq 6,000 ft | 8,000 ft | Yes | 2 | 4 | 5 |

Figure 3C:
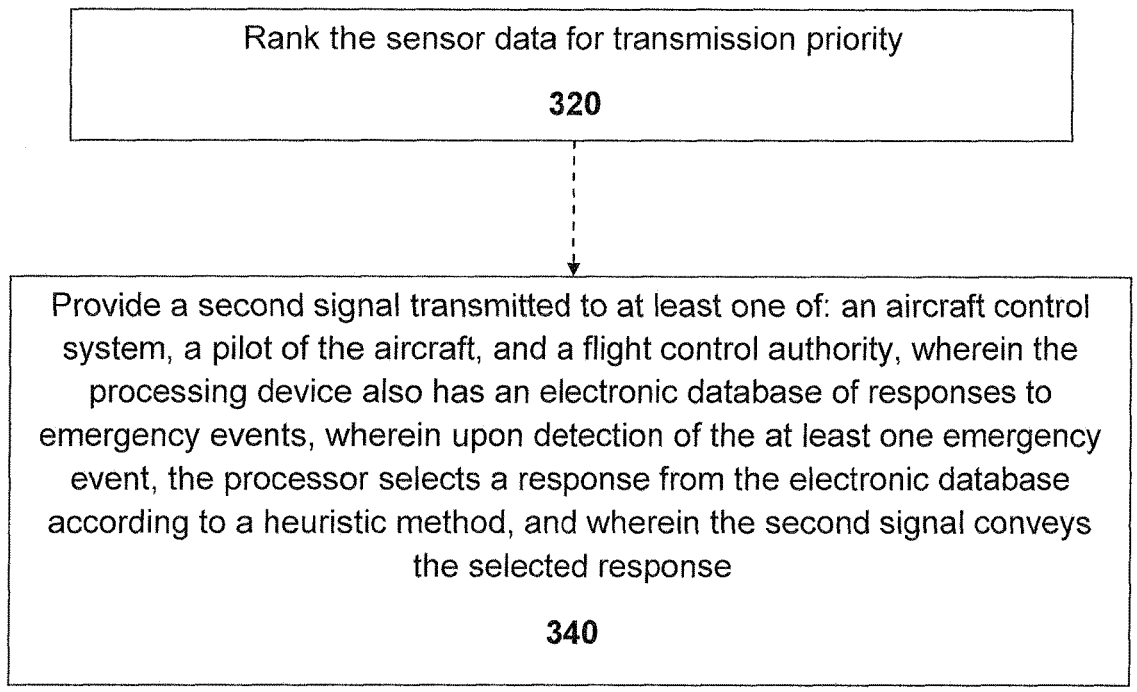
FIG. 3C is a flow chart showing a software heuristic system according to the present invention.

FIG. 3C shows an embodiment with an additional step for the method for monitoring aircraft safety according to the present invention. This additional step 340 performs heuristic analysis to find potential responses to the emergency events. After the ranking in step 320 has been performed, a second signal is provided that is transmitted to at least one of: an aircraft control system, a pilot of the aircraft, and a flight control authority, wherein the processing device also has an electronic database of responses to emergency events, wherein upon detection of the at least one emergency event, the processor selects a response from the electronic database according to a heuristic method, and wherein the second signal conveys the selected response.

Working Example 1

A working example of the system was constructed using off-the-shelf hardware. An ARDUINO® UNO® processor and circuit board were electrically connected to a Secure Digital (SD) flash card by a SEEEDSTUDIO® SD card shield. An ADAFRUIT® 10-DOF inertia measurement unit, which combines accelerometer, gyroscope, and magnetic sensors, was used to simulate data received from an aircraft FDAU, and was electrically connected to the processor on the circuit board through an RS-232 serial connector. A TINYTRAK4® GPS position encoder was connected to the processor on the circuit board to serve as a transmitter. The components were powered by electrical connection to a 9-volt battery.

The processor was programmed to record data from the inertia measurement unit at 1.5 second intervals and perform parametric bracket analysis for the duration of a flight. If an emergency event was detected, the processor was programmed to direct the GPS position encoder to transmit an alert sequence over 144-430 MHz to a location 85 miles away. The board and all components were placed inside an aluminum housing, and the battery switched on. The housing was placed inside a glider aircraft. The glider was launched by aerotow and subjected to several variations in altitude, pitch, yaw, and roll. The variations were severe so as to mimic the effect of common emergency events in commercial aircraft.

During the flight, several maneuvers caused the system to register emergency events and transmit an alert sequence accordingly.

Working Example 2

The hardware setup was the same as in Working Example 1, except that a LINK SPRITE® GPS V3 was connected to provide GPS data for analysis. The flight sequence was the same as in Working Example 1.

During the second flight, several maneuvers caused the system to register emergency events and transmit an alert sequence accordingly.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for monitoring aircraft safety, comprising the steps of:

providing an aircraft having a plurality of sensors connected to a flight data acquisition unit (FDAU);

providing a processing device having a processor, a non-transitory computer-readable memory, and a transmitter, wherein the processing device is in communication with the FDAU, wherein sensor data stored within the FDAU is communicated to the processing device, wherein, during flight of the aircraft, the processor analyzes the sensor data from the FDAU to detect an occurrence of at least one emergency event;

ranking the sensor data for transmission priority according to the following steps:

a) assigning to the sensor data a first coefficient according to sensor data type;

b) assigning to the sensor data a second coefficient according to the severity of the at least one emergency event;

c) multiplying said first and second coefficients to determine an urgency number of the sensor data; and d) ordering the sensor data from highest to lowest urgency numbers; and providing a signal transmitted to a flight control authority upon ranking of the sensor data, wherein the signal has an alert sequence according to the ranking.

2. The method of claim 1, wherein the signal is transmitted over a satellite network.

3. The method of claim 1, wherein the sensor data is compressed before the signal is transmitted to a flight control authority.

4. The method of claim 1, wherein an emergency event is detected when the value of the sensor data lies outside a pre-determined range having a low bound and a high bound.

5. The method of claim 4, wherein the first coefficient is assigned to give high priority to sensor data from sensors within the airframe of the aircraft.

6. The method of claim 4, wherein the second coefficient is assigned to give high priority to sensor data that is at least 5% higher than the high bound.

7. The method of claim 4, wherein the second coefficient is assigned to give high priority to sensor data that is at most 5% lower than the low bound.

8. The method of claim 1, wherein the signal is transmitted from the aircraft.

9. The method of claim 1, wherein the processing device is connected to the FDAU by wires.

10. The method of claim 1, wherein the processing device is wirelessly connected to the FDAU.

11. The method of claim 10, wherein the wireless connection is encrypted.

12. The method of claim 1, further comprising the steps of:

assigning to the sensor data a third coefficient according to the relationship between multiple sensors; and multiplying the product of said first and second coefficients with the third coefficient to determine an urgency number of the sensor data.

13. The method of claim 1, wherein the signal is additionally transmitted to an electronic database of responses to emergency events, wherein upon receiving the signal, a processor in the electronic database selects a response from the electronic database according to a heuristic method, and wherein the selected response is conveyed to at least one of: an aircraft control system, a pilot of the aircraft, and a flight control authority.

14. The method of claim 13, wherein the aircraft control system automatically implements the selected response.

15. The method of claim 13, wherein the response is conveyed to the pilot of the aircraft by at least one of: visual, auditory, and tactile methods.

16. The method of claim 1 further comprising providing a second signal transmitted to at least one of: an aircraft control system, a pilot of the aircraft, and a flight control authority, wherein the processing device also has an electronic database of responses to emergency events, wherein upon detection of the at least one emergency event, the processor selects a response from the electronic database according to a heuristic method, and wherein the second signal conveys the selected response.

17. The method of claim 16, wherein the aircraft control system automatically implements the selected response.

18. The method of claim 16, wherein the second signal is conveyed to the pilot of the aircraft by at least one of: visual, auditory, and tactile methods.

19. A system for monitoring aircraft safety, comprising:

an aircraft having a plurality of sensors connected to a flight data acquisition unit (FDAU); and a processing device having a processor, a non-transitory computer-readable memory, and a transmitter, wherein the processing device is in communication with the FDAU, wherein sensor data stored within the FDAU is communicated to the processing device, wherein, during flight of the aircraft, the processor analyzes the sensor data from the FDAU to detect an occurrence of at least one emergency event, wherein the processing device provides a ranking of the sensor data for transmission priority according to the following steps:

a) assigning to the sensor data a first coefficient according to sensor data type;

b) assigning to the sensor data a second coefficient according to the severity of the at least one emergency event;

c) multiplying said first and second coefficients to determine an urgency number of the sensor data; and d) ordering the sensor data from highest to lowest urgency numbers;

and wherein the transmitter transmits a signal to a flight control authority upon ranking of the sensor data, the signal having an alert sequence according to the ranking.

20. The system of claim 19, further comprising an electronic database of responses to emergency events in communication with the processing device, wherein the electronic database selects a response from the electronic database according to a heuristic method, and wherein the selected response is conveyed to at least one of: an aircraft control system, a pilot of the aircraft, and a flight control authority.

* * * * *